2,183,743

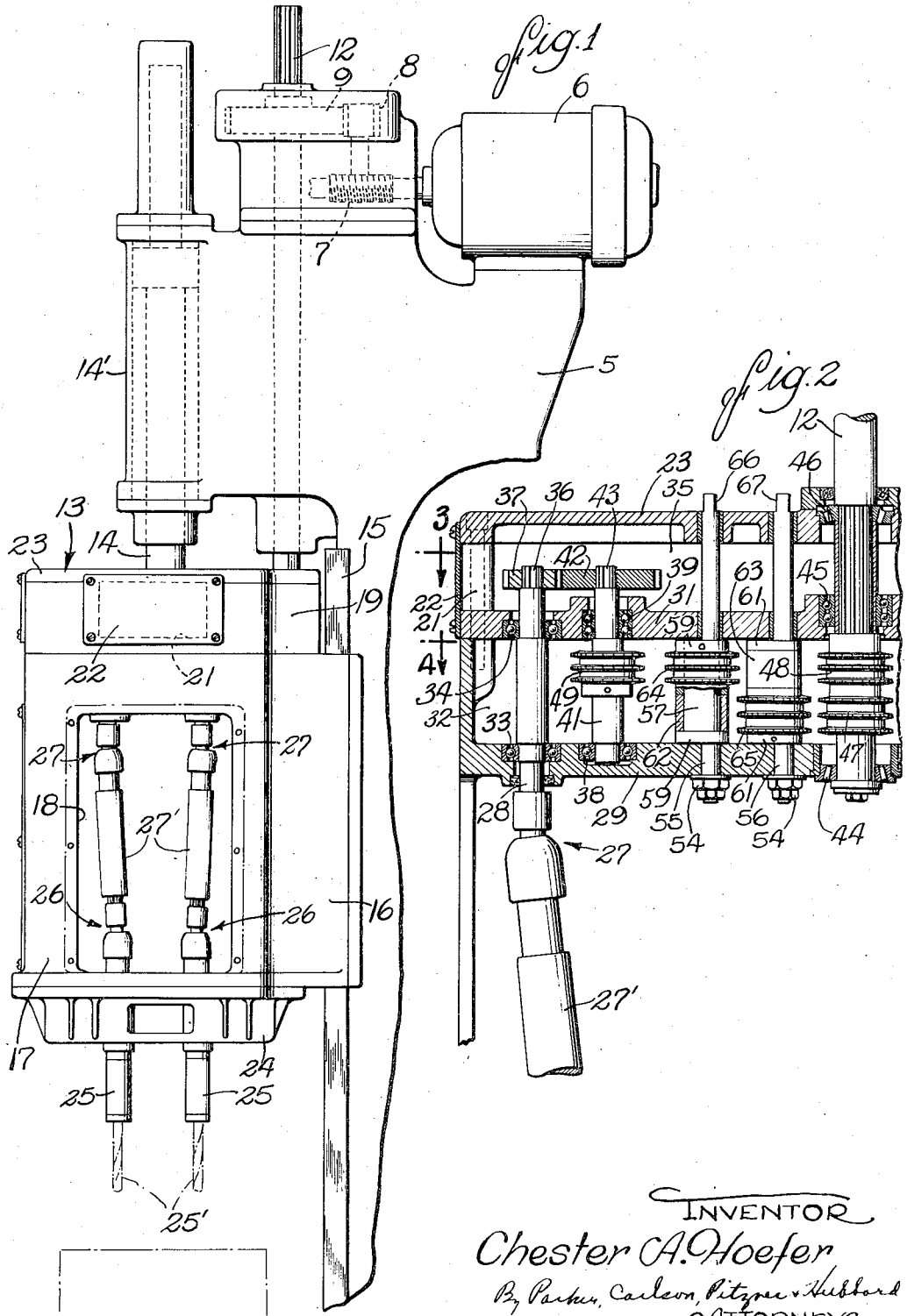
Dec. 19, 1939.     C. A. HOEFER     2,183,743
MULTIPLE SPINDLE MACHINE TOOL
Filed June 26, 1937     2 Sheets-Sheet 1
INVENTOR
Chester A. Hoefer
By Parker, Carlson, Pitzner & Hubbard
ATTORNEYS Dec. 19, 1939.  C. A. HOEFER  2,183,743
MULTIPLE SPINDLE MACHINE TOOL
Filed June 26, 1937    2 Sheets-Sheet 2
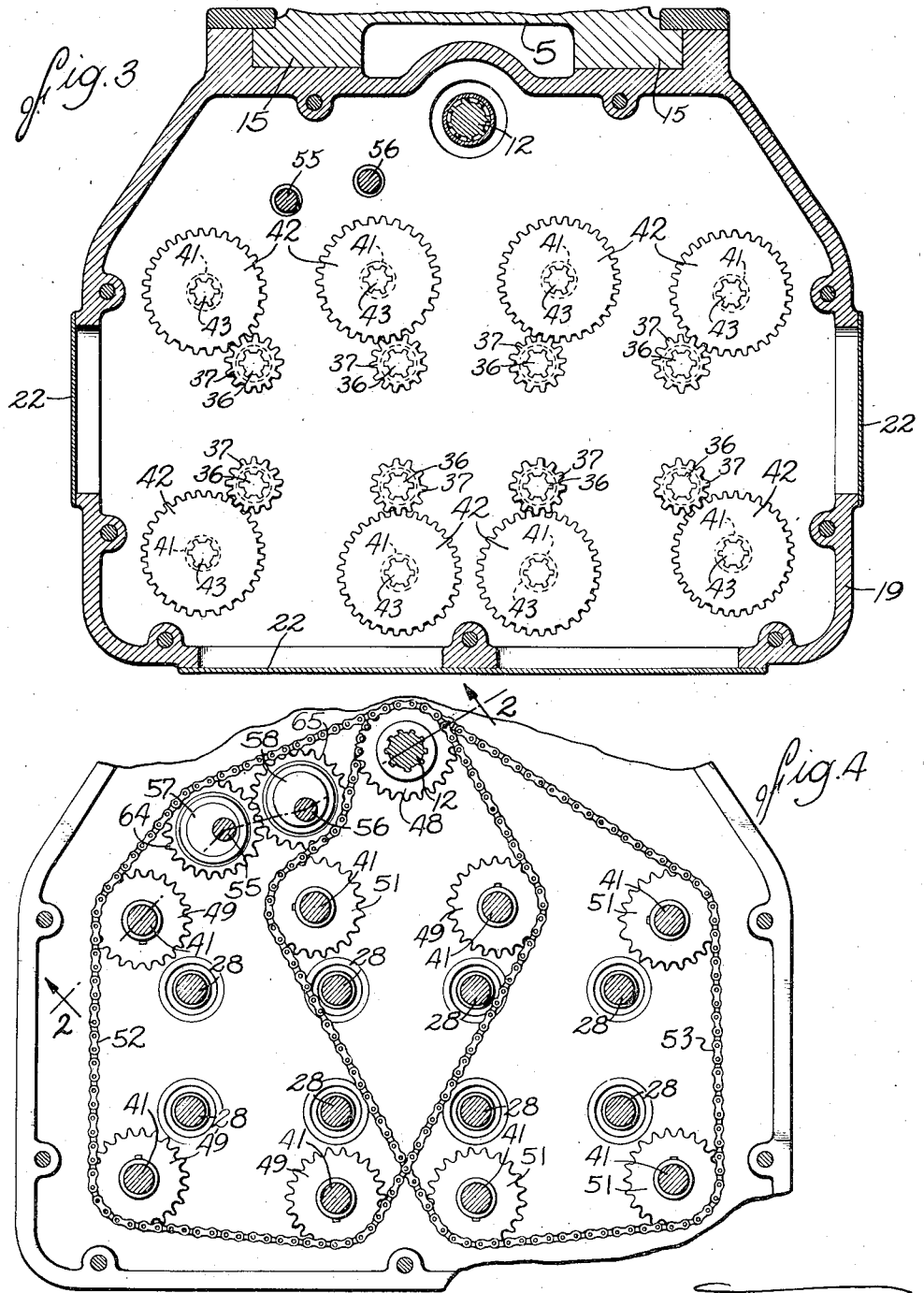
INVENTOR
Chester A. Hoefer
By Parker, Carlson, Pitzner & Hubbard
ATTORNEYS Patented Dec. 19, 1939

UNITED STATES PATENT OFFICE 2,183,743

MULTIPLE SPINDLE MACHINE TOOL

Chester A. Hoefer, Freeport, Ill., assignor to Hoefer Mfg. Co., Inc., Freeport, Ill., a corporation of Illinois Application June 26, 1937, Serial No. 150,490

2 Claims. (Cl. 77—22)

The invention has reference to machine tools of the multiple spindle type such, for instance, as multiple spindle drilling machines of the type in which each spindle has a universal connection with its driving shaft so as to permit of changes in the lateral positions of the spindles relative to the respective drive shafts.

The primary object of the present invention is to provide, in a multiple spindle machine tool of the above character, a novel spindle drive mechanism which permits the rotational speed of each spindle to change quickly and conveniently and without reconstruction of any substantial portion of the drive gearing.

A more detailed object is to extend the drive from a common power shaft to each of a series of spindle drive shafts through a novel connection which through the interchange of pick-off gears or the like enables the speed of any selected spindle in the series to be changed as desired.

The invention also resides in the novel construction and arrangement of the driving parts which permits of ready change in the individual spindle drives.

Further objects as well as the advantages and the uses of the invention will be apparent after reading the following description taken in connection with the drawings in which Figure 1 is a side elevational view of a drilling head and associated head frame parts of a multiple spindle drilling machine, certain of the parts being broken away for the sake of simplicity.

Fig. 2 is a vertical section taken substantially along the line 2—2 of Fig. 4.

Fig. 3 is a transverse section taken substantially along the line 3—3 of Fig. 2.

Fig. 4 is a fragmentary transverse section taken substantially along the line 4—4 of Fig. 2.

While the invention is susceptible of various modifications and alternative constructions, I have shown in the drawings and will herein describe in detail the preferred embodiment, but it is to be understood that I do not intend to limit the invention by such disclosure but aim to cover all modifications and alternative constructions falling within the spirit and scope of the invention as expressed in the appended claims.

The invention has been illustrated as embodied in a drilling machine of the multiple spindle type comprising a head frame 5 carrying a motor 6 suitably connected through speed reduction gearing including a worm 7, a pinion 8, and a gear 9 into which is splined a vertical shaft 12. The latter constitutes a single source of power extending to a tool head 13 with which the shaft 12 reciprocates.

The head is supported for vertical reciprocation in the frame 5 by a piston rod 14 with which it is connected and which, in turn, is secured to a piston reciprocable in an hydraulic cylinder 14'. The spindle head is guided in its vertical movements by the usual guide surfaces 15 which engage corresponding guideways formed in arms 16 of the body of the head. The parts so far described and their construction may be of any suitable character well understood in the art.

The tool head 13 is composed of a main portion 17 having one or more side openings 18 therein which openings are adapted to be covered by removable plates (not shown), a housing 19 secured to the upper end of the portion 17 and having side apertures 21 adapted to be covered by removable plates 22, and a top plate 23 is secured to the lower end of a piston rod 14 and to the housing 19.

Removably attached to the lower end of the head portion 17 is a bearing plate 24 in which tool spindles 25 are journaled and supported in spaced relation according to the work parts to be drilled, tapped, or otherwise machined by the tools 25' carried by the spindles. Each spindle is connected through universal joints 26 and 27 and an intervening shaft 27' with a drive shaft 28. The universal connections permit the lateral positions of the spindles 25 to be changed as desired according to the character of the work to be machined while the positions of the drive shafts 28 remain fixed. Constructions of this general type are well known to those skilled in the art.

The spindle drive shafts project through a partition 29 spaced from the upper end of the head portion 17 and the parallel lower wall 31 of the upper housing 19 and are journaled in suitable bearings 33 and 34 supported by these walls which cooperate to define a chamber 32. The top end of each of the shafts 28 projects above the web 31 into the chamber 35 formed between the web 31 and the top or cap member 23 and thereat is splined as at 36 to engage corresponding internal splines on a speed change gear 37. The drive shafts 28 are, of course, distributed around the bearing walls 29 and 31 so as to provide ample space for the drive gearing now to be described.

Mounted adjacent each drive shaft 28 in bearings 38 and 39 in the webs 29 and 31 and with their ends projecting above the web 31 are a plurality of what may be termed stub shafts 41 to which pick-off gears 42 are detachably coupled as by splines 43. Each gear 42 meshes with one of the gears 37. It will be apparent that after removal of one cover plate 22, any one set of pick-off gears 37 and 42 is accessible for removal and replacement thereof by other gearing giving a different ratio of speed. An individual speed change drive connection is thus extended to each spindle drive shaft 28.

The main drive shaft 12 extends through alined apertures in the webs 29 and 31 and the top plate 23 and is journaled in bearings 44, 45, and 46 so as to move vertically with the spindle head 13. Fast on the shaft 12 between the webs 29 and 31 and within chamber 32 are a pair of multi-tooth sprockets generally designated 47 and 48. Driving power is transmitted from these sprockets to the stub shafts 41 which, as shown in Figs. 3 and 4, are arranged in two groups. Each shaft of one group carries a sprocket 49 at the upper end of the portion within the chamber 32. The shafts of the other group carry sprockets 51 on the lower ends adjacent to the web 29. A drive chain 52 is trained around the sprockets 48 and 49, while a chain 53 meshes with the sprockets 47 and 51. To simplify the illustration, the chains 52 and 53 are omitted from the disclosure in Fig. 2. From Fig. 4, it will be apparent that all of the sprockets 49 and 51 are driven in the same relative directions.

Rotatably journaled in the walls 23, 29, and 31 and extending upwardly therethrough are a pair of shafts 55 and 56 carrying eccentrics 57 and 58. Disposed between suitable thrust collars 59 and 61 positioned by bushings 62 and 63 are idling sprockets 64 and 65 which rotate on the eccentrics. The ends of the shafts 55 and 56 project above the top wall 23 and have squared upper ends 66 and 67 for engagement by a suitable tool such as a wrench or crank arm with which to effect rotational movements of these shafts. The chains 52 and 53 are trained over the sprockets 64 and 65 so that an operator, by rotating the shafts 55 and 56, may tension the chains to the desired degree. By tightening nuts 54, the adjusted positions of the eccentrics may be maintained.

Since each spindle drive shaft 28 has its own individual and independent driving means, each spindle may be driven at a chosen speed regardless of the speed at which any other spindle is driven. This arrangement is particularly advantageous as, for instance, where one or more spindles may be carrying tools which should be operated at a relatively lower or higher speed than some other tool or tools owing perhaps to the size of the tool or the character of the material upon which the work is to be done. By extending the drive from the main drive shaft 12 to the lower ends of the shafts 41, the upper ends of the shafts 28 and 41 are exposed and thus adapted for connection by removable pick-off gears which constitute a simple and convenient form of speed change device.

I claim as my invention:

1. In a multiple spindle machine tool, the combination of two spaced bearing plates, a plurality of tool spindle driving shafts journaled in said plates each with its opposite ends projecting beyond the respective plates, a plurality of idler shafts journaled in said plates and each extending parallel to and disposed adjacent one of said shafts with one end projecting beyond one of said plates, means providing driving connections between each pair of projecting ends of said driving and idler shafts, each of said connections comprising a pair of pick off gears readily removable from said ends, a power driven member, and means disposed between said plates and transmitting power from said member to each of said idler shafts.

2. In a mulitple spindle machine tool, the combination of a support, a plurality of tool spindle driving shafts journaled in said supoprt each with its opposite ends projecting therebeyond, a plurality of idler shafts journaled on said support and each extending parallel to and disposed adjacent one of said shafts with one end projecting beyond the support, means providing driving connections between each pair of projecting ends of said driving and idler shafts, each of said connections comprising a pair of pick off gears readily removable from said ends, sprockets fast on said idler shafts between said gears and the opposite ends of said driving shafts, a power driven sprocket, and an endless chain extending around all of said sprockets.

CHESTER A. HOEFER.